United States Patent [19]

McFarland et al.

[11] Patent Number: 5,541,039
[45] Date of Patent: Jul. 30, 1996

[54] METHOD FOR FORMING OPTICALLY ACTIVE WAVEGUIDES

[75] Inventors: Michael J. McFarland, Washington; Karl W. Beeson, Princeton; Keith Horn, Long Valley; Chengjiu Wu, Morristown, all of N.J.

[73] Assignee: AlliedSignal Inc., Morris Township, N.J.

[21] Appl. No.: 342,399

[22] Filed: Nov. 18, 1994

Related U.S. Application Data

[63] Continuation of Ser. No. 917,525, Jul. 17, 1992, abandoned, which is a continuation of Ser. No. 456,411, Dec. 26, 1989, abandoned.

[51] Int. Cl.$^6$ .............................. G03C 5/00; G02B 6/10
[52] U.S. Cl. .......................... 430/290; 430/20; 430/13; 430/321; 430/332; 385/129; 385/130
[58] Field of Search ............................... 430/13, 20, 290, 430/321, 332; 385/129, 130

[56] References Cited

U.S. PATENT DOCUMENTS

| | | | |
|---|---|---|---|
| 3,689,264 | 9/1972 | Chandross et al. | 430/290 |
| 3,809,732 | 5/1974 | Chandross et al. | 430/281 |
| 3,864,130 | 2/1975 | Nassenstein et al. | 430/290 |
| 4,508,808 | 4/1985 | Lee et al. | 430/290 |
| 4,609,252 | 9/1986 | Wong et al. | 430/321 |
| 4,621,962 | 10/1986 | Garito | 430/20 |
| 4,792,208 | 12/1988 | Ulman et al. | 350/96.34 |
| 4,796,971 | 1/1989 | Robello et al. | 350/96.34 |
| 4,818,070 | 4/1989 | Gunjima | 350/347 V |
| 4,867,516 | 9/1989 | Baken | 350/96.14 |
| 4,892,392 | 1/1990 | Broer | 430/20 |
| 4,963,448 | 10/1990 | Ichimura et al. | 430/20 |
| 4,983,479 | 1/1991 | Broer et al. | 430/281 |
| 4,994,209 | 2/1991 | Okazaki | 350/96.12 |
| 5,100,589 | 3/1992 | Ticknor | 385/132 |
| 5,142,605 | 8/1992 | Diemeer et al. | 385/130 |

FOREIGN PATENT DOCUMENTS

| | | | |
|---|---|---|---|
| 358476 | 3/1990 | European Pat. Off. . | |
| 63-129339 | 6/1988 | Japan | 430/321 |

OTHER PUBLICATIONS

Rochford et al., "Fabrication of integrated optical structures in polydiacetylene films by irreversible . . . ", Appl Phys. Let. 55, No. 12, pp. 1161–63 (1989).
"Synthesis and Use of Acryate Polymers for Non–linear Optics, Organic Materials for Non–linear Optics," Hill et al, pp. 404–411 (1989).
Thackara et al., "Poled electro–optic waveguide formation in thin–film organic media", Appl. Phys. Lett. 52, No. 13, Mar. 1988, Am. Inst. of Physics, N.Y.
Boyd, "Application requirements for nonlinear optical devices and the status of organic materials" J. Opt. Soc. of Am./B, 6, No. 4, Apr. 1989.
Diemeer et al., "Photoinduced channel waveguide formation in nonlinear optical polymers" Elect. Lett., 26, No. 6, Mar. 1990.
Planar Polyamide Optical Waveguide M. Brady and F. Heidrich, IBM Technical Disclosure Bulletin, 23, 2999 (1980).
Photoinduced Refractive Index Increase in Poly (Methylmethacrylate) and its Applications, Appl. Phys. Lett. 16, 486 (1970) Tomlinson et al.
Multi–layers, Electro–optic and Thermo–optic Effects . . . , Wells & Bloor in "Organic Materials for Non–linear Optics", Royal Soc. Chem., London, 398 (1989).
Photochromic Stripe Waveguides for Integrated Optics, Hallam et al., IEE Conf. Publ. 201, 26 (1981).
Light Guiding Structures of Photoresist Films, H. Weber et al., Appl. Phys. Lett., 20, 143 (1972).
Polymer waveguide star coupler, Takato & Kurokawa, Appl. Opt., 21, 1940 (1982).
The Fabrication and Characterization of Polymer Optical Conductors, Srinivasan et al., J. Appl. Polym. Sci., 29, 2231 (1984).
Fabrication of an integrated optical waveguide chemical vapor . . . , Giuliani et al., Appl. Phys. Lett., 48, 1311 (1986).
Organic and Polymeric Nonlinear Optical Materials, ACS Workshop, May 16–19, Virginia Beach, VA (1988), R. Lytel.
Polymeric non–linear optical waveguides, Brettle et al., Proc. SPIE 824, 171 (1987).
Thin Film Processing of Polymers for Nonlinear Optics, Small et al., Proc. SPIE 682, 160 (1986).
Second harmonic generation in poled polymer films, Singer et al., Appl. Phys. Lett., 49, 248 (1986).
Polymeric Guided Wave Optics, McDonach et al., SPIE Meeting, Boston, Mass., Sep. 5, 1989.
Refractive–index patterns in doped PMMA films, recorded with a HeNe laser, Polymer 28, 659– 62 (1987) H. Franke.
High–resolution photorefractive polymer for optical recording of waveguide gratings, Driemeier et al., Appl. Op. 25, 2960–66 (1986).
Electro–optic phase modulation and optical second–harmonic generation in corona–poled polymer films, Singer et al., Appl. Phys. Lett. 53, 1800–2 (1988).
Non–linear Optics: A Molecular Basis of Electronic Susceptibilites, Buckley et al., Poly. Mat. Sci. & Eng. Proc. of the ACS, 54, 502–9 (1986).
Development of Polymeric Nonlinear Optical Materials, Stamatoff et al., Pol. Mat. Sci. & Eng. Proc. of the ACS, 54, 502–9 (1986).
Development of Polymeric Nonlinear Optical Materials, Leslie et al., Mol. Cryst. Liq. Cryst. 153, 451–177 (1987).
Polymeric Materials for Guided Wave Devices, Beeson et al., copies of slides/presentation Int. Chem. Congress of Pac. Basin Soc., Honolulu, HI, Dec. 17–22, 1989.

Primary Examiner—George F. Lesmes
Assistant Examiner—Bernard P. Codd
Attorney, Agent, or Firm—Melanie L. Brown; Roger H. Criss

[57] ABSTRACT

Optically active (optically non-linear or electro-optically active) waveguides are formed by depositing a layer of organic material, typically polymeric material, comprising one or more opticaly active components, and subjecting predetermined regions of the layer to actinic radiation to alter the refractive index of these regions.

8 Claims, No Drawings

METHOD FOR FORMING OPTICALLY ACTIVE WAVEGUIDES

This application is a continuation of application Ser. No. 07/917,525 filed Jul. 17, 1992, abandoned, which is a continuation of application Ser. No. 07/456,411 filed Dec. 26, 1989, abandoned.

FIELD OF THE INVENTION

This invention relates to use of actinic radiation to create waveguiding regions possessing electro-optic or non-linear optical properties in organic films.

BACKGROUND OF THE INVENTION

The field of electro-optics and nonlinear optics is concerned primarily with the use of light as a carrier of information. This information may take the form of visible images, digital data or analog signal information. In order to utilize light in this manner, it is necessary to develop media which will provide for the production, the transmission, the detection, and for the processing of the information impressed upon the light. One very important means for directing and processing light involves the use of waveguides. A waveguide is a physical structure which is capable of transmitting light (that is, it is transparent) while at the same time confining it to a particular region in space. In an optical waveguide, confinement of light may be achieved by varying the refractive index (an optical material property) within the region of the waveguide so that it is higher than that of its surroundings. Light will tend to propagate within the region of higher refractive index and so can be moved from a starting point to an ending point along a path which is defined by the waveguide region.

An important subclass of waveguides are nonlinear and electro-optically active waveguides. In these waveguides the light is not simply passively transported from one point to another, but is acted upon or processed while traveling within the guide. That is, these waveguides are capable of changing the nature of the light as it passes through. Important types of changes include rotation or alteration of the state of optical polarization, modulation of the amplitude of the optical intensity, modulation of the phase of the optical radiation, alteration of the directional characteristics of the radiation, and alteration of the frequency (or wavelength) of the radiation. By altering the properties of the radiation within a waveguide or a waveguide region, it is possible to encode and decode information and to route it as desired.

Electro-optically active waveguides have predominantly been fabricated from inorganic crystalline materials such as lithium niobate. These materials in general have high dielectric constants and moderate electro-optic coefficients. They are crystalline materials which require high temperature processing and thus are not easily fabricated and are not easily integrated with other semiconductor devices. Further, since the source of their electro-optic activity stems from motions of atoms in their crystal lattice, which is slow compared to optical frequencies, these materials are limited in their frequency response. These limitations have led to interest in using organic and especially polymeric organic materials for nonlinear and electro-optic applications. Organic materials have generally lower dielectric constants and certain organic materials have been shown to possess very large nonlinearities and electro-optic coefficients. Organic and polymeric organic materials are processed at much lower temperatures than inorganics and are amenable to solution and other coating techniques that make them much easier to fabricate than inorganic crystalline materials and which provides for processing conditions appropriate for integration with delicate semiconductor devices. Thus, organic materials are much more suitable for achieving the goals of integrated electro-optics, where light production, light processing and detection can all be accomplished in close proximity without the need for extraneous connections. In addition, the source of the optical nonlinearity of organic materials lies in the motion of their electrons which is much faster than the motion of a crystal lattice and thus, organic materials are of greater utility for processing information at high frequencies.

There is a need however for techniques and materials to provide for the fabrication of waveguides in thin or thick films of nonlinear and electro-optically active organic materials. There are several methods taught by the prior art for creating waveguiding regions in films of inactive polymeric films. U.S. Pat. No. 3,809,732 teaches a technique called "photo-locking" by which passive, inactive waveguides can be produced by a multistep process involving one of three types of chemical reactions between a transparent polymer and a high index, photoactive "doping" monomer. These three are chemical attachment, dimerization, and polymerization. In each case the polymer is doped with the monomer (which must be volatile), then photo-locked in the desired region and baked to remove the volatile monomer from all other areas. Brady has shown [M. Brady and P. Heldrich, IBM Technical Disclosure Bulletin, 23, 2999 (1980)] that polyimide organic films can be heated with a laser to thermally increase the index of refraction of selected areas. Tomlinson has shown [W. Tomlinson et al., Appl. Phys. Lett. 16, 486 (1970)] that photocrosslinking increases the local density of poly(methyl methacrylate) and thus increases its refractive index. Wells has shown [P. Wells and D. Bloor, in "Organic Materials for Non-linear Optics", [Royal Society of Chemistry, London, pg. 398 (1989)] that an organic dye dissolved in the polymer poly(4-vinyl pyridine) could be photochemically bleached by exposure to a mercury discharge lamp resulting in a lowered refractive index surrounding a waveguide region. Hallam has shown [A. Hallam et al., IEE Conf. Publ. 201, 26 (1981)] that photochromic fulgides materials dissolved in polymers can be converted from a colorless to a colored state, thus increasing the refractive index in a waveguide region. Weber has shown [H. Weber et al., Appl. Phys. Lett., 20, 143 (1972)] that photoresist can be patterned with an argon ion laser to produce waveguide structures.

A number of references teach the use of polymers which may be photochemically crosslinked to achieve free-standing "ribs" of polymer after the remaining, uncrosslinked, material is dissolved away H. Weber et al., Appl. Phys. Lett., 20, 143 (1972)]; N. Takato and T. Kurokawa, Appl. Opt., 21, 1940 (1982); B. Srinivasan and G. Martin, J. Appl. Polym. Sci., 29, 2231 (1984); and J. Giuliani et al., Appl. Phys. Lett., 48, 1311 (1986)]. Polymer ribs produced in this way may serve as waveguides. In each of these, the result is a passive waveguide structure. The more desirable fabrication of a nonlinear or electro-optically active waveguide structure is not achieved. Nonlinear or electro-optically active waveguides have been produced by means of lithography and etching on the substrates or on the organic material layers. Lytel has shown [R. Lytel, ACS Workshop, Organic and Polymeric Nonlinear Optical Materials, May 16–19, Virginia Beach, Va. (1988)] that a waveguide pattern can be produced in a metal film by lithography and etching. The metal then forms electrodes used to "pole" the organic material between them and thus change the refractive index along the electrode direction. Brettle has shown [J. Brettle et al., "Polymeric non-linear optical waveguides", Proc. SPIE 824, 171 (1987)] that etched metal electrode patterns can serve as masks for the diffusion of monomeric, nonlinear organic molecules into polycarbonate films by dipping into hot solutions of the monomers. Small has shown [R. D. Small et al., "Thin Film Processing of Polymers for Nonlinear Optics", Proc. SPIE 682, 160 (1986)] that etching a mask material on top of a layer of organic polymer followed by anisotropic etching can create waveguide structures in the polymer layer. In these examples, physically defined waveguide regions are obtained in nonlinear or electro-optically active organic materials by using lithography and etch techniques. These techniques suffer not only from increased fabrication complexity, but also from the fact that the substrate must be subjected to the harsh conditions of lithography and liquid or reactive ion etches. Since the goal of integrated optics is to fabricate optical processors and detectors in close proximity, these techniques may be largely unsuitable due to the damage that may result to sensitive electro-optic devices and related processors.

There is a need for a method which will produce nonlinear or electro-optically active waveguide structures, such as are possible in crystalline inorganic materials, in the more desirable organic thin films, but without utilizing techniques which may be deleterious to other substrate components.

SUMMARY OF THE INVENTION

We have discovered that actinic radiation can be used to alter the refractive index of certain organic and polymeric organic materials which are either intrinsically optically active (i.e., optically active or electro-optically active), or are precursors which can be caused to give an optically nonlinear or electro-optical response. This alteration of refractive index allows the controlled delineation of waveguiding regions in these materials by control of the spatial pattern of exposure dose and exposure time. Thus, this invention allows for the production of optically nonlinear or electro-optically active waveguides in organic materials. Further, since the technique uses irradiation to accomplish the change in index, and since the amount of change will be directly related to the amount of irradiation, this method allows for careful control of refractive index and refractive index profiles within the waveguides.

Accordingly, the present invention provides a method for forming an optically active waveguide, which comprises the steps of forming, on a substrate, a layer of an organic material—usually a polymeric organic material—comprising one or more optically active components, or components transformable to an optically active state, followed by subjecting one or more predetermined regions of said organic material layer to actinic radiation, at a wavelength and in an amount and of intensity sufficient to alter the refractive index of said predetermined regions, to thereby create an optically active waveguide. Transformation to the optically active state may be effected by any suitable means, as, for example, by radiation-induced reaction of the precursor before, during or after the waveguide delineation step, or by the operation of "poling" as described below, which may also be conducted before, during or after the waveguide delineation step.

DETAILED DESCRIPTION OF THE INVENTION

This invention details a versatile method for delineating waveguides, with actinic radiation, in a nonlinear or electro-optically active organic material or a precursor material which can be rendered active. For purposes of the present invention, actinic radiation is defined as light in the visible, ultraviolet or infrared regions of the spectrum, as well as electron beam, ion or neutron beam or X-ray radiation. It may be in the form of incoherent light or a coherent source such as a laser. By delineating it is meant that the position, dimensions and course of the waveguide region are determined by the spatial pattern of exposure dose and exposure time of the actinic radiation upon the organic material. The technique is applicable to all of the major classes of waveguides, those being slab, channel and rib waveguides, which are well known to those skilled in the art. The discovery of this invention is that the refractive index of optically nonlinear organic materials, or precursor materials that can be caused to have an optically nonlinear response, can be altered by irradiation with actinic radiation and that this alteration allows for the delineation of optical waveguides within these materials. This invention is thus distinguished from the prior art in that it allows for the creation of active waveguide structures in organic materials with the use of actinic radiation.

In the method of the invention a thin or thick film of an optically nonlinear or electro-optically active organic material is formed on a suitable substrate. The film may be formed by any of a number of methods known in the art, such as spinning from a solvent, dip coating, roller coating, doctor blading or evaporating.

The optically nonlinear or electro-optically active organic material can contain molecular groups of an electron donor-electron acceptor type such as:

D—Z—A where D is an electron donating substituent such as H, methoxy, ethoxy, alkoxy, phenoxy, amino, alkyl substituted amino, phenyl, pyrrole, indole, thiazole, $CH_3S$, —NR—$(CH_2)_n$OH wherein R is an alkyl group having 1–20 carbons and n is an integer of from 1–20, or $(HO(CH_2)_n)HN$ wherein n is an integer of from 1–20; A is an electron-accepting substituent such as cyano, nitro, dicyanovinyl, tricyanovinyl or $CO_2R$ where R is an aryl or alkyl group and Z is an element which allows conjugation between the donor and acceptor groups such as:

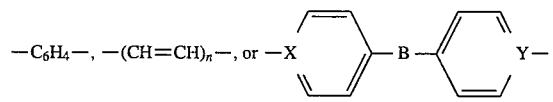

where X is C, N, or other electron donating group, Y is C, N, $NCH_3^+$, or other electron accepting group, B is a π conjugating group such as phenyl, biphenyl, pyridil or other heterocycle, C=C, N=N, C=N, $C=N^+O^-$ and the like. Optionally, either D or A, or both, may be chemically modified with a photolabile protecting group which can be removed with actinic radiation to yield an organic nonlinear material D—Z—A as above.

The optically nonlinear organic material can be of the form of a monomer or may be in the form of a solid solution of the optically nonlinear entity with a glassy, film forming, transparent polymer or such an entity may be part of the film forming polymer by the use of attaching groups, so that the active groups are depending from the polymer backbone chain. The polymer backbone chain may be a homopolymer or a copolymer chain. If copolymeric, it will ordinarily be derived from comonomers of the type capable of forming optically clear, generally amorphous polymers, such as methyl or higher alkyl methacrylate, methyl or higher alkyl acrylate, acrylamide, methacrylamide, styrene or substituted styrene. The organic film layer my be optionally treated in the manner of Singer et al., Appl. Phys. Lett., 49, 248 (1986), in order to impart non-centrosymmetric character to the material. This involves an operation known as "poling" wherein the material, suitably in the form of a light modulator or waveguide, usually in thin film form, is heated to a temperature near or above its glass transition temperature, $T_g$, and is subjected to an applied electric field of appropriate magnitude for a suitable period of time, and is thereafter cooled to temperatures below the $T_g$. As a result of this operation, a non-centrosymmetric orientation is imparted to the molecular transducer and the material acquires an electro-optic response, that is, the index of refraction of the material will change in direct linear response to an applied electric field.

Particularly desirable optically active materials for purposes of the present invention are disclosed in commonly assigned, U.S. Appl. Ser. No. 456,420 by Wu et al. for "Electro-Optical Materials and Light Modulator Devices Containing Same", filed of even date herewith, now U.S. Pat. No. 5,067,404. These include compounds of the formula:

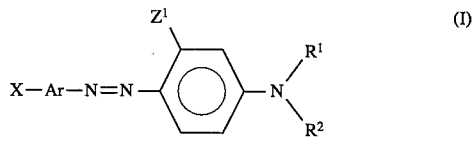
(I)

wherein
(a) X is selected from the group consisting of:
   (1) —$NO_2$,
   (2) —CN,
   (3) —$COOR^3$ wherein $R^3$ is alkyl, straight chain, cyclic or branched having 1–20 carbon atoms,
   (4) —CH=C(CN)$_2$ and
   (5) —C(CN)=C(CN)$_2$;
(b) Ar is selected from the group consisting of
(1)

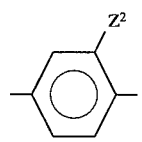

wherein $Z^2$ is
   (i) —H
   (ii) —OH
   (iii) —OC(O)—CH=CH$_2$
   (iv) —OC(O)—C(CH$_3$)=CH$_2$
   (v)

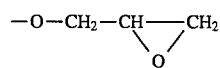

(vi)

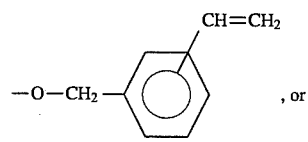
, or (vii) —O(CH$_2$)$_2$—OCH=CH$_2$;
(2)

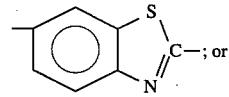
; or (3)

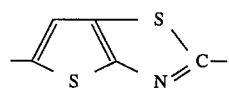

(c) $Z^1$ is selected from the group consisting of —H and —OH;
(d) $R^1$ is selected from the group consisting of
   (1) —H,
   (2) alkyl, straight chain, branched or cyclic, having about 1–20 carbon atoms,
   (3) —$C_nH_{2n}OH$, wherein n is an integer of from about 1–20,
   (4) —(CH$_2$)$_m$—CH=CH$_2$, wherein m is an integer of from about 1–20,
   (5)

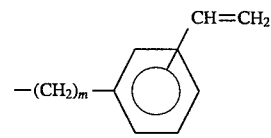

wherein m is an integer of from about 1–20 and the —CH=CH$_2$ substituent is in the m- or p- position,
   (6) —(CH$_2$)$_m$—O—M wherein m is an integer of from about 1–10, and wherein M is
     (i) —CH=CH$_2$,
     (ii) —C(O)—CH=CH$_2$,
     (iii) —C(O)—C(CH$_3$)=CH$_2$,
     (iv)

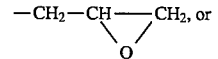

(v)

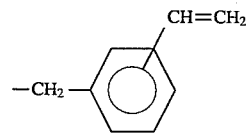

wherein the —CH=CH$_2$ substituent is in the m- or p- position and
   (7) an alkylene bridging group having 2 to 4 carbon atoms connecting the N atom to the o- position of the aromatic ring to which the N atom is attached; and
(e) $R^2$ is selected from the group consisting of
   (1) —H, (2) alkyl, straight chain, branched or cyclic, having about 1–20 carbon atoms,
(3) —$C_nH_{2n}$OH wherein n is an integer of from about 1–20, and
(4) an alkylene bridging group having 2 to 4 carbon atoms connecting the N atom to the o- position of the aromatic ring to which the N atom is attached.

In more preferred embodiments of the above compounds, $Z^1$ and $Z^2$ may not both be H if neither one nor both of $R^1$ and $R^2$ represent an alkylene bridging group having 2 to 4 carbon atoms connecting the N atom to the o- position of the aromatic ring to which the N atom is attached.

In order to maximize the electro-optical response and, in particular, the electro-optic coefficients, it is desirable to utilize compounds having large dipole moment, such as those wherein Ar is:

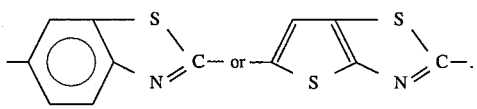

Other particularly desirable compounds of formula (I) above, include those wherein X is —$NO_2$, and those wherein at least one of $R^1$ and $R^2$ is an alkylene bridging group having 2 to 4 carbon atoms connecting the N atom to the o- position of the aromatic ring to which the N atom is attached, or any combination thereof. Compounds of the formula (I), above, which can be crosslinked in the course of being subjected to actinic radiation, as contemplated herein, include especially those in which $R^1$ has a terminal —CH=$CH_2$ or —C($CH_3$)$_m CH_2$ group, as above described.

Film-forming compositions for making optically active waveguides in accordance with the present invention further include, but are not limited to, optically active (optically nonlinear or electro-optically active) materials, especially electro-optically active polymer compositions comprising a compound of formula (I), above, together with an optically clear polymer, generally an amorphous polymer, suitably selected from the group consisting of polymethylmethacrylate (PMMA), polystyrene and polycarbonate, wherein said compound of formula (I) comprises of from about 1 to about 60 percent by weight of the combined weight of the compound and the polymer. These compositions can be applied to suitable substrates, from the melt or from solution in a suitable solvent, to form a film which can be transformed into a waveguide utilizing the invention method.

In order to maximize refractive index change and optionally to maximize electro-optic response it is preferred to utilize the highest concentration of photochemically sensitive (and electro-optically active) element. This, however, must be done in such a way as to preserve solubility in appropriate solvents if spin casting from solution is utilized. It also must allow for preservation of suitable transparency. Typically 20%–80% substitution (by mole) provides good performance.

Further, the present invention can effectively utilize optically active, especially electro-optically active vinyl monomeric compositions, including acrylic compositions which can be polymerized using generally known polymerization procedures to form optically active, especially electro-optically active homopolymers, or which can be copolymerized with other monomers of the type capable of forming optically clear, generally amorphous polymers, such as methyl or higher alkyl methacrylate, methyl or higher alkyl acrylate, acrylamide, methacrylamide, styrene or substituted styrene. These homopolymers and copolymers are suitable for fabrication into effective light modulator devices. The monomeric compositions of the present invention are those of general formula (I), above, wherein $R^1$ is selected from the group consisting of (a) —($CH_2$)$_m$—CH=$CH_2$ wherein m is an integer of from about 1–20, (b)

wherein m is an integer of from about 1 to 20, and the —CH=$CH_2$ substituent is in the m- or p- position, and (c) —($CH_2$)—O—M wherein M is selected from the group consisting of —CH=$CH_2$, —C(O)—CH=$CH_2$,=C(O)—C($CH_3$)=$CH_2$, or

wherein the —CH=$CH_2$ substituent is in the m- or p- position.

Homopolymers of the vinyl monomeric compositions described above are obtained using known polymerization procedures. These homopolymers are characterized by having pendant groups of "tranducer" moieties, designated R in the formulas set forth below, bound to a backbone chain built up of recurring units as illustrated below:

(A)

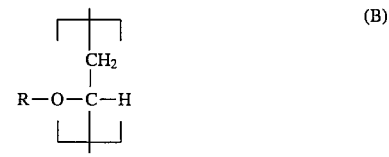
(B)

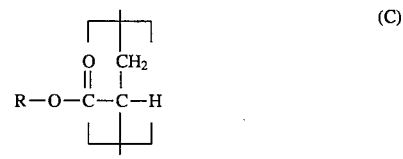
(C)

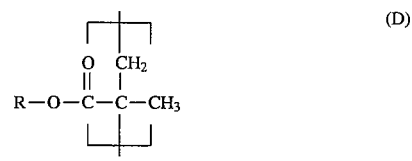
(D)

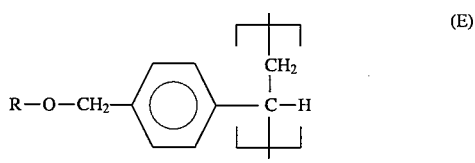
(E)

and

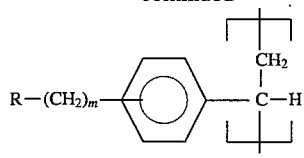 (F)

wherein R is

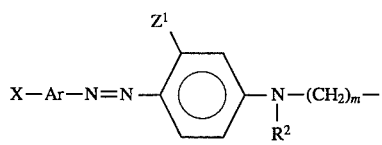

wherein
(a) X is selected from the group consisting of —NO₂, CN, —CH=C(CN)₂, —C(CN)=C(CN)₂, and —COOR³ wherein R³ is alkyl, straight chain, branched or cyclic, having about 1–20 carbon atoms,
(b) Ar is selected from the group consisting of

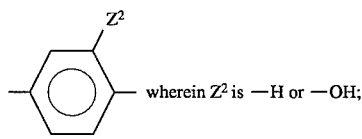 (1)

wherein Z² is —H or —OH;

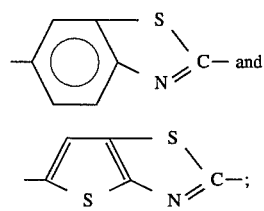

(c) Z¹ is selected from the group consisting of —H and —OH;
(d) R² is selected from the group consisting of
(1) —H,
(2) alkyl, straight chain, branched or cyclic, having about 1–2 carbon atoms,
(3) —C$_n$H$_{2n}$OH, wherein n is an integer of from about 1–20, and
(4) an alkylene bridging group having 2 to 4 carbon atoms connecting the N atom to the o- position of the aromatic ring to which the N atom is attached; and
(e) m is an integer of from about 1 to 20.

Preferred homopolymer compositions (A) through (F) above, embody the —X Ar, Z¹, Z², and R² embodiments described as preferred in connection with compounds of formula (I), above. These homopolymer compositions may be employed neat or in blends with amorphous, film-forming polymers which exhibit low light scattering losses, such as polymethyl acrylate, polymethyl methacrylate, polycarbonate and polystyrene.

Lastly, preferred film-forming compositions for use in the present invention include copolymers of a comonomer selected from the group consisting of alkyl acrylate wherein the alkyl moiety contains from about 1 to 5 carbons; alkyl methacrylate wherein the alkyl moiety contains from about 1 to 5 carbons, acrylamide, methacrylamide, styrene and substituted styrene, and a comonomer having the formula:

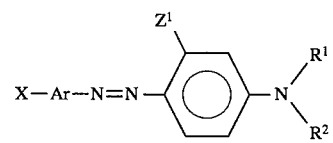 (I)

wherein
(a) X is selected from the group consisting of —NO₂, —CN, —CH=C(CN)₂, —C(CN)=C(CN)₂, and —COOR³ wherein R³ is alkyl, straight chain, cyclic or branched having 1–20 carbon atoms,
(b) Ar is selected from the group consisting of

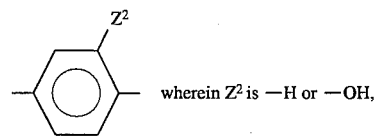 (1)

wherein Z² is —H or —OH,

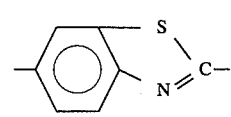 (2)

and

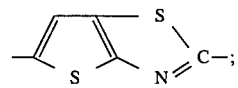 (3)

(c) Z¹ is selected from the group consisting of —H and —OH;
(d) R¹ is selected from the group consisting of
(1) —(CH₂)$_m$—CH=CH₂, wherein m is an integer of from about 1–20,
(2)

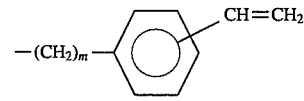

wherein m is an integer of from about 1–20 and the —CH=CH₂ substituent is in the m- or p- position,
(3) —(CH₂)$_m$—O—M wherein m is an integer of from about 1–10, and wherein M is
(i) —CH=CH₂,
(ii) —C(O)—CH=CH₂,
(iii) —C(O)—C(CH₃)=CH₂, or
(iv)

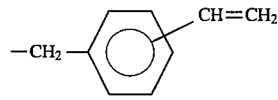

wherein the —CH=CH₂ substituent is in the m- or p- position and
(e) R² is selected from the group consisting of
(1) —H,
(2) alkyl, straight chain, branched or cyclic, having about 1–20 carbon atoms,
(3) —C$_n$H$_{2n}$OH wherein n is an integer of from about 1–20, and
(4) an alkylene bridging group having 2 to 4 carbon atoms connecting the N atom to the o- position of the aromatic ring to which the N atom is attached;

Preferred embodiments of the above described copolymer compositions are those wherein —X, Ar, Z¹, Z², R¹ and R² represent the embodiments described as preferred in connection with formula (I), above. Further, these copolymer compositions may contain in the order of from about 1 to about 90 mole percent of units derived from the

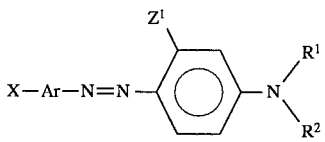

comonomer, more desirably from about 1 to about 95, preferably from about 20 to 80 mole percent so derived. Preferred comonomers include methyl acrylate and methyl methacrylate. It is preferred that the molecular weight be appropriate for spin-casting high quality thin (0.1–10 micrometer thick) films. Typically, 5,000–200,000 molecular weights are appropriate, preferably about 10,000 to 100,000 for weight averaged molecular weight (as determined by intrinsic viscosity or by size exclusion chromatography in comparison to polystyrene standards). It is preferable to utilize polymers with as high a glass transition temperature as possible in order to provide for the greatest operating temperatures. This, of course, must be in keeping with allowed processing temperatures for additional processing and with thermal decomposition temperatures of the polymer. Glass transition temperatures of 90° C.–220° C. are convenient and preferred for many applications; glass transition temperatures of 90° C.–150° C. are especially convenient.

As a general proposition, the photosensitive element should be chosen so as to undergo a photochemical transformation which results in a significant change in polarizability (or refractive index) when irradiated with the actinic radiation of choice without producing (even in small quantities) species which are absorptive at the wavelength of use. It is also important to minimize the role of secondary photochemistry (i.e., photodegradation of desired product), especially where such photochemistry yields products which are absorptive at the wavelength of use. It is desirable that the photochemical transformation be relatively efficient in order to minimize exposure dose; however, sensitivity is not a major issue because of intense light sources available. Particularly useful are the diazo compositions which are described above and in our afore-mentioned commonly assigned U.S. Appl. Ser. No. 456,420 filed of even date herewith, now U.S. Pat. No. 5,061,404.

The substrate may be any material on which it is desired to establish a waveguide including semiconductor materials such as silicon, silicon oxide, gallium arsenide, silicon nitride as well as glass, quartz, plastics, ceramics and crystalline materials. The substrate may or may not contain other devices, either electrical or electro-optical in nature, or desired topographical features such as grooves. On substrates where the waveguide region in an organic layer is of lower refractive index than the substrate material it is necessary to first form a layer of refractive index lower than the organic waveguide material. Such a layer is known in the art as a buffer layer and may be comprised of a semiconductor oxide, a lower refractive index polymer or a spin-on silicon dioxide glass material.

Once the organic material is formed onto the substrate in a thin or thick film, actinic radiation is directed onto the film in order to delineate the waveguide region. The wavelength region of the actinic radiation must be chosen so that the refractive index of the organic optically nonlinear material is altered from its original, unexposed, value. If the index of the irradiated material is increased over that of the unirradiated material then the light is directed to fall on the areas where the waveguide is to be created. If the index of the irradiated material is less than that of the unirradiated material then the light is directed to fall on the areas which will surround the waveguide. The most important mechanism for changing the refractive index by the method of the invention is the alteration of the strength or position of the optical absorption of the organic material. That is, if the actinic radiation decreases the absorption oscillator strength or the wavelength of the absorption, then the refractive index will be decreased. If the actinic radiation causes an increase in the absorption oscillator strength or in the wavelength of the absorption, then the refractive index will be increased. Optically nonlinear organic materials that exhibit these two types of response to actinic radiation comprise the most preferable method of practicing the invention.

It is desirable that, after the waveguides have been delineated, the optical device remain as prepared and not degrade with time. Thus it is preferable that the photochemical excitation be carried out with relatively short wavelength (or high energy) radiation so that exposure to radiation normally encountered in processing (e.g., room lights) not alter the waveguide. Alternatively, the processing can utilize a multiphoton process initiated by a high intensity source of actinic radiation such as a laser. Thus, activation by ultraviolet light (300–400 nm wavelength) is convenient. Also, activation by deep ultraviolet light (190–300 nm wavelength) is useful. Convenient sources are high pressure xenon or mercury-xenon arc lamps fitted with appropriate optical filters to select the desired wavelengths for processing. Also, short wavelength coherent radiation is useful for the practice of this invention. An Argon ion laser operating in the "UV" mode at several wavelengths near 350 nm is desirable. Also, a frequency-doubled Argon ion laser with output near 257 nm wavelength is highly desirable. Electron beam or ion beam excitation may also be utilized.

Control of the spatial profile of the actinic radiation, that is, where it falls upon the organic material, is achieved by one of two methods. In the first, a mask bearing the desired waveguide pattern is interspersed between the source of actinic radiation and the optically nonlinear organic material film. The mask has transparent and opaque regions which allow the radiation to fall only on the desired regions of the film surface. Masked exposure of thin films is well known in the art and may include contact, proximity and projection techniques for "printing" the waveguide pattern onto the film. The second method of spatial control is to use a source of actinic radiation which comprises a directed or focussed beam such as a laser or electron beam. Such a beam intersects only a small area of the organic film surface. The pattern of the desired waveguide is achieved by moving this small intersection point around on the film surface either by scanning the beam in space or by moving the substrate so that the intersection point is changed relative to a stationary beam. These types of exposure using a beam source are known in the art as "direct-write" methods. The ability of the invention to allow waveguide production with the use of these two versatile exposure methods greatly simplifies processing requirements, making mass production more accessible than with the methods of the prior art.

By choosing the spatial characteristics of irradiation it is possible to create both slab and channel waveguides in the organic films. A slab waveguide is one in which the optical wave is confined only to the plane of the film. A channel waveguide is one in which the optical wave is also confined laterally within the film. A channel structure is necessary for many nonlinear and electro-optic devices because it allows the light to be directed to certain areas of the substrate as well as providing a mechanism for splitting and combining optical waves. The ability to easily define the more versatile channel waveguides by simply controlling the spatial profile of the actinic radiation makes the method of the invention markedly different from prior art techniques such as using lithography and etching to define physical channels in the film. Those techniques require several additional steps and harsh etching conditions which are simply incompatible with many sensitive devices and substrates. In addition, the etched waveguide channels must possess abrupt changes in refractive index at the edges of the waveguide and generally the edge roughness can be no better than the lithographic quality, which leads to increased optical losses due to scattering. In contrast, the spatial profile of the actinic radiation can be adjusted so that waveguides produced by the method of the invention may possess graded changes in refractive index at their boundaries or may smooth the edges to produce a higher quality waveguide with less optical loss.

The advantages of utilizing organic materials for optically nonlinear devices are many. One of the most important of these is the ability to fabricate devices in a manner which is compatible with other semiconductor materials and devices. This ability facilitates the goal of integrated optics which is to produce devices where several optical functions such as light production, optical encoding, switching, and detection are all accomplished on a single substrate without the need for extraneous device interconnections. The method of this invention further extends the utility of organic materials in that it provides a technique for producing waveguides by a simple irradiation of the material. This "gentle" technique is much more suitable for substrates bearing other sensitive devices than methods which create a physically delineated waveguide by chemical etching or reactive ion etching (RIE). In addition to utilizing less harsh conditions to create the waveguide, this technique is spatially controllable. That is, the actinic radiation need only be directed to the area where the waveguide is to be created, not to areas containing sensitive devices. This is in contrast to the above mentioned etching methods which require that the entire substrate by placed into the etching medium.

In preferred embodiments of this invention, materials containing photochemical elements and optionally electro-optically active elements strongly bound to a suitable polymer backbone are utilized. These materials provide for optical waveguide devices which exhibit significant and important advances over waveguide devices prepared from mixtures of dyes in polymer matrices described by prior art. These advantages include the following:

1. Aggregation of active elements is prevented. Typically, small molecules dissolved within a polymer matrix such as PMMA will aggregate. At the desirable high concentrations, this may occur spontaneously during the film spinning (or other application) process. Even at lower concentrations, this aggregation may occur over time. Such aggregation is highly undesirable for the optical waveguide devices of this invention since (a) aggregation causes scattering of optical radiation and thus, optical losses within the waveguide; (b) aggregation can reduce the physical integrity of the material; (c) aggregation can lower the use temperature; and (d) aggregation can interfere with the poling process for poled electro-optically active materials. Polymer-bound materials, on the other hand, typically do not aggregate, even at very high concentrations or over long periods of time. Thus, the desirable optical and physical properties are maintained.

2. Loss of material during bakeout. It is common in processing polymeric materials, especially those prepared by spin-casting from an organic solvent, to subject the material to a bake step typically at temperatures near or above the glass transition temperature in order to remove residual organic solvent and to relieve internal strain within the polymer. Photochemical or electro-optic elements simply dissolved in a polymer matrix, may readily vaporize (or migrate) during this process. Polymer bound elements will not, however.

3. Health hazards. Elements which exhibit photochemical or electro-optic activity are often, in molecular form, carcinogenic, teratogenic, or in other ways hazardous to the environment. Polymers incorporating these elements generally do not allow release to, or interaction with, the environment and are much safer to utilize in device fabrication.

4. Electric fields. Polymeric materials containing dissolved molecular species often will not withstand high electric fields since charged mobile species can be created. Polymers incorporating elements which are strongly bound may allow for application of higher electric fields and thus will provide for a higher degree of electro-optic activity.

For purposes of the present invention, optical waveguide devices are devices which accomplish some desired change in the propagation of light. These include, for example, a lens or grating in a "slab" or planar waveguide; a channel guide in which light is guided through a channel or path; a splitter, which splits an optical beam into two or more optical beams; a combiner, which brings together two or more guided optical beams into a single guided optical beam; or a cross-over, which allows for one guided optical beam to cross the path of another optical beam. Electro-optical waveguide devices, which are a particularly important aspect of the present invention, are devices in which an electric field is used to alter the propagation of light within the waveguide. Exemplary electro-optical waveguide devices include electro-optical modulators, in which the intensity of the transmitted light is directly determined by an applied electric field; electro-optic phase shifters, wherein the phase of light is changed by application of an electric field; and electro-optic switches, wherein the path of a guided beam of light is determined by application of an electric field.

The following examples will further illustrate the scope of the invention. They are intended to better teach the method of the invention and do not represent a limitation thereon.

EXAMPLE 1

A solution of three parts 2-methoxyethyl ether to one part of a copolymer prepared from 96% methylmethacrylate and 4%:

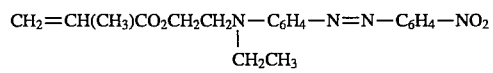

was spin coated onto a silicon wafer bearing a one micron thick layer of thermal silicon oxide. The 2-methoxyethyl ether solvent was evaporated in an oven at 125° C. to yield a solid polymer film of 2.2 micron thickness. A mask comprising an opaque line 12 microns in width by 2 cm in length was placed over the polymer film layer and the film was then exposed to the ultraviolet light of a 500 W mercury-xenon lamp for two hours. At the end of the exposure the mask was removed and the film was examined with a microscope using crossed polarizers. The area of the film which had been under the mask (not exposed) was clearly visible due to the difference in optical refractive index with the areas which were irradiated.

EXAMPLE 2

The substrate bearing the film of Example 1 was cleaved twice perpendicularly to the waveguide line to yield a section of-length 12 mm. 810 nm laser light was coupled into a single mode polarization preserving fiber optic cable. The opposite end of this fiber was brought into contact with the cleaved edge of the organic polymer film in a method known in the art as "fiber butt-coupling" or "fiber end-firing". When the fiber end was placed directly in front of the unirradiated line area laser light was coupled into the line and was observed to emerge as a bright output spot from the opposite cleavage face using an infra-red viewing device. This illustrates that the ultraviolet radiation had lowered the refractive index of the polymer film surrounding the masked area and thus created a channel waveguide in that area of the film.

EXAMPLE 3

A copolymer was prepared from the same monomers as in Example 1 except that the molar ratio was 98:2 rather than 96:4. In the manner of Example 1, a dried polymer film was produced on a substrate of optical grade quartz window. An ultraviolet/visible absorption spectrum was taken of the polymer film before and after 45 minutes of irradiation under the same mercury-xenon lamp. It was observed that the optical density of the film in the main visible absorption band, centered at 470 nm, was decreased from 1.3 to 0.68 by this exposure. Subsequently, the film was heated to 130° C. (above the glass transition temperature of the polymer) for 20 minutes and the absorption spectrum was taken again. There was no recovery in the strength of the absorption band. This example indicated that the source of the waveguide production of Examples 1 and 2 was the lowering of the refractive index in the irradiated areas due to a reduction in the oscillator absorption in the visible region. The lack of thermal recovery established the permanence of the method and eliminates a transient, nonequilibrium mechanism such as cis-trans isomerization of the azo linkage of the larger monomer.

EXAMPLE 4

In the manner of Example 1, a pair of intersecting channel waveguides was delineated in a 2 micron thick film of the 98:2 copolymer of Example 3. 810 nm laser light was coupled into one of these two guides and was observed to exit from the other end. No light was observed to exit from the end of the other waveguide. The intersection angle of the two channel waveguides was 12°. This example demonstrates the creation of a simple channel waveguide device known in the art as a "crossover".

EXAMPLE 5

In the manner of Example 1, a channel waveguide was produced in a 2 micron thick film of the 98:2 copolymer of Example 3. In this case the mask comprised a curved line rather than a straight one. When 810 nm laser light was introduced into the input end of the waveguide region it was observed to follow the curve of the waveguide region and exit from a cleavage face perpendicular to the input face. This bending of the optical wave was conclusive proof that a channel waveguide exhibiting lateral confinement in the plane of the film had been created.

EXAMPLE 6

A film of the copolymer of Example 1 was spun on a substrate of glass covered with a thin layer of transparent, electrically conductive indium-tin oxide (ITO) and dried to give a layer 3.1 micron in thickness. On top of the polymer layer, a thin layer of gold was sputtered. Electrical connections were made to the gold and ITO layers and the sample was heated to 129° C. in an oven. A dc voltage was established between the gold and ITO layers such that the polymer layer experienced a static electric field strength of 0.75 MV/cm. The field was maintained while the oven and sample were cooled to room temperature and was then removed. The gold layer was dissolved in aqua regia and the film was rinsed with water and dried. The glass substrate bearing the organic polymer layer was mounted in the beam of a pulsed Nd:YAG laser emitting light at wavelength 1.064 micron. As the polymer film was tilted relative to the laser beam, light of wavelength 0.532 micron was detected emerging from the polymer film in a beam colinear with the 1.064 micron laser beam. The 0.532 micron light was detected in maximum amount when the polymer film was at an angle of 57° to the laser beam. At a constant angle, the amount of 0.532 micron light detected was observed to follow a square law dependence on the power of the laser at 1.064 micron. The detection of frequency doubled (wavelength halved) radiation at high laser irradiation powers establishes that the polymer was an optically nonlinear material.

EXAMPLE 7

An aluminum electrode measuring 1 mm by 1 cm by 100 angstroms thick was evaporated onto a silicon substrate bearing a 0.66 micron layer of thermal oxide. Over this was spun coat a 0.62 micron layer of Accuglass® 410 spin-on-glass (a product of Allied-Signal Inc.) which was thermally cured at 160° C. A 1.41 micron thick film of a copolymer consisting of 80 mole percent methyl methacrylate and 20 mole percent:

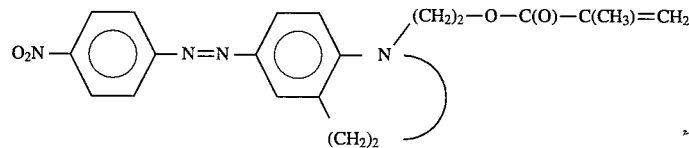

was spun over the Accuglass 410 layer from a 2-methoxyethyl ether solution followed by an oven bake to remove the solvent. The polymer layer was exposed for 3 hrs. to ultraviolet light from a 1000 W xenon lamp through a channel waveguide mask positioned so that the waveguide ran over the center of the long axis of the aluminum electrode. The width of the waveguide was 7 microns. Over this organic polymer film a second layer of Accuglass 410 was spin coated to a thickness of 0.60 micron. A second aluminum electrode was evaporated on top of the Accuglass 410 so that it was positioned directly above the first, with the waveguide area of the polymer sandwiched between them. Electrical connections were made to the upper and lower aluminum electrodes and the entire sample was placed in an oven and heated to 136° C. A dc voltage was applied between the two aluminum electrodes such that the polymer waveguide region experienced a static field of 0.72 MV/cm which was maintained until the sample was cooled to room temperature. The sample substrate was cleaved and fiber coupled in the manner of Example 2 such that 810 nm laser light could be passed through the channel waveguide between the two electrodes. The output light from the other end of the waveguide was collected with a GRIN rod lens, passed through a Glan-Taylor polarizer and into a light detector. When a low voltage square wave signal was applied to the aluminum electrodes the amount of light detected was seen to rise and fall in concert with the applied voltage signal. This device constituted an example of an electro-optic phase modulator in channel waveguide form. The necessary voltage to induce a $\pi$ phase shift over the 1 cm path length of the electrodes was less than 5 V. The modulator was operated at frequencies up to 1 MHz. This example demonstrates that the method of the invention allows for the creation of channel waveguide structures in electro-optically active organic material.

EXAMPLE 8

In the manner of Example 1, channel waveguides were prepared in a copolymer of 80 mole percent methyl methacrylate and 20 mole percent:

EXAMPLE 9

In the manner of Example 7, except for utilization of 1.3 μm wavelength light, the copolymer of Example 8 was used to produce an electro-optic phase modulator except that the waveguide regions were 3 to 10 microns in width. They were fiber coupled in the manner of Example 2 to demonstrate channel waveguiding activity.

EXAMPLE 10

One part of a monomeric dye of the structure:

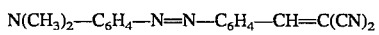

and 19 parts of poly(styrene) are dissolved in 60 parts of dimethylsulfoxide and spin coated onto silicon wafers bearing 1 micron of thermal oxide. The wafers are baked at 80° C. to remove the solvent, leaving dry polymer/dye films. The films are exposed to actinic radiation from a xenon lamp through a mask bearing opaque lines of width 4 micron for a period of 3 hours. After exposure, the substrates are cleaved and the unexposed lines are end-fire coupled with a fiber optic carrying laser light of 1.3 micron wavelength. The laser light is channel waveguided within the unexposed region of the organic polymer film.

EXAMPLE 11

In the manner of Example 7, a channel waveguide electro-optic phase modulator is constructed with the composition of Example 10. The electro-optic modulator is used to modulate laser light of 1.3 micron wavelength.

EXAMPLE 12

One part of an organic material with the following structure:

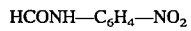

and nine parts of poly(methyl methacrylate) were dissolved in 30 parts of diglyme and spin coated onto quartz substrates. In the manner of Example 3, absorption spectra were recorded before and after exposing the films to 300 nm radiation in a Rayonet reactor for a period of 3 hours. The main absorption peak at 315 nm was observed to disappear with irradiation and was replaced by a longer wavelength peak at 356 nm. This increase in absorption at longer wavelengths caused the refractive index of the organic film to increase.

EXAMPLE 13

The organic composition of Example 12 is coated onto silicon substrates bearing 1 micron of thermal oxide and exposed to 300 nm light through an opaque mask with a thin transparent line. The refractive index of the narrow exposed region is increased yielding a channel waveguide.

EXAMPLE 14

The experiment of Example 13 is repeated except the source of actinic radiation is a 308 nm excimer laser which is scanned in a thin focussed beam across the surface of the organic film to yield a channel waveguide.

EXAMPLE 15

The organic composition of Example 12 is treated in the manner of Example 6 to yield a nonlinear optical material which frequency doubles laser radiation of 1.064 micron wavelength.

EXAMPLE 16

A solution of the copolymer of Example 1 is spin coated onto a silicon wafer bearing a 1 micron thick layer of thermal silicon oxide. The solvent is evaporated in an oven at 125° C. to yield a film approximately 2 microns thick. The dried film is placed onto a programmable moveable stage onto which a 514 nm laser beam focussed to a 5 micron diameter spot can be directed. In addition, an electric field is applied between the bottom and top surfaces of the film using a corona discharge in the air above the film. The stage is moved so that the laser beam traces out a narrow line across the polymer film. In the resulting thermalphysical process, the laser beam momentarily heats the narrow polymer strip to above the glass transition temperature of the polymer and causes the strip to become electro-optically active.

EXAMPLE 17

A copolymer prepared from 90% methyl methacrylate and 10%:

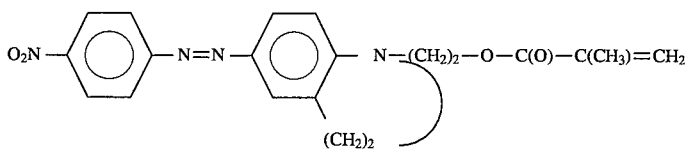

was spin coated onto a silicon wafer from an 18% solids solution in 2-methoxyethyl ether. The wafer was baked for 30 minutes at 130° C. to remove the solvent. The dried polymer film was measured to be 0.8 μm thick. Half of the film was covered with an opaque mask and the remaining half was exposed to a 1000 W xenon lamp through a 360 nm broad band filter (50 nm FWHM). A Metricon thin film analyzer was used to determine the refractive index (at 670 nm) of the irradiated and unirradiated portions of the film. The results are listed in the table below:

|             | 332 J/cm² | 544 J/cm² |
|-------------|-----------|-----------|
| n (unexposed) | 1.604   | 1.606     |
| n (exposed)   | 1.575   | 1.566     |
| change in n   | 0.029   | 0.040     |

These observed changes in refractive index are 10 to 13 times larger than those reported for PMMA (in the prior art) in this wavelength region, for comparable or larger exposure doses.

EXAMPLE 18

A solution of 4 parts 2-methoxyethyl ether and 1 part of a copolymer prepared from 80% methylmethacrylate and 20%

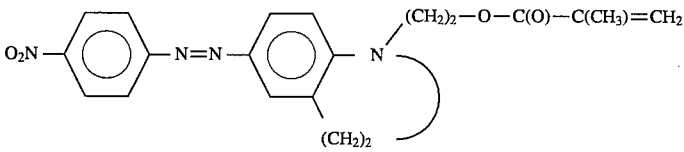

was spin coated onto a fused silica disc. The 2-methoxyethyl ether solvent was evaporated in an oven at 80° C. to yield a polymer film 0.8 μm thick. After covering half of the film with an opaque mask, the sample was exposed to the ultraviolet light of a 500 W xenon arc lamp for two hrs. At the end of the exposure, the sample was removed and the indexes of refraction n of the exposed and unexposed portions of the film were measured by a Metricon prism coupler at three different wavelengths (633 nm, 670 nm, and 815 nm). The results are listed in the table below:

|             | 633 nm | 670 nm | 815 nm |
|-------------|--------|--------|--------|
| n (unexposed) | 1.723 | 1.688 | 1.639 |
| n (exposed)   | 1.614 | 1.606 | 1.592 |
| change in n   | 0.109 | 0.082 | 0.047 |

EXAMPLE 19

A film of the copolymer of Example 1 is spun onto a silicon wafer bearing a 1.5 micron thick layer of thermal oxide. A focussed 351 nm beam approximately 2 microns in diameter from an argon ion laser is scanned across the wafer at a speed of 100 microns/second. The laser power is 1 milliwatt. The laser beam is then translated 15 microns in a direction perpendicular to the first scan direction. The laser beam is scanned across the wafer a second time resulting in a set of two parallel lines with a center-to-center spacing of 15 microns. The two laser-written lines define the boundaries of a channel waveguide since the index of refraction of the polymer film is lower in the two exposed lines than in the unexposed region between the lines. In the manner of Example 2, the wafer is cleaved twice and 810 nm light from a diode laser is directed into one end of the waveguide. The light is observed to emerge as a bright spot from the opposite cleavage face illustrating that a channel waveguide is formed.

Since various changes may be made in the invention without departing from its spirit and essential characteristics, it is intended that all matter contained in the description shall be interpreted as illustrative only and not in a limiting sense, the scope of the invention being defined by the appended claims.

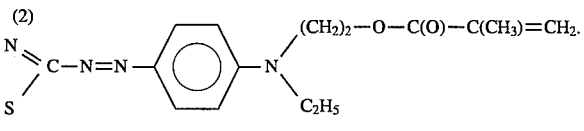

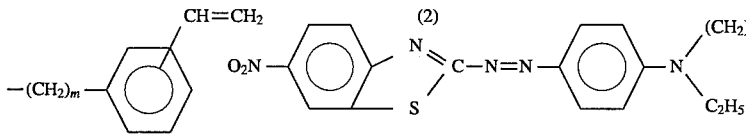

8. The method of claim 1 wherein said second comonomer is
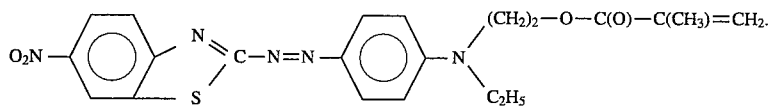

We claim:

1. The method for forming a waveguide possessing electro-optical properties which comprises the steps of forming, on a substrate, a layer of an organic material and subjecting one or more predetermined regions of said organic material layer to actinic radiation, at a wavelength and in an amount and of intensity sufficient to alter the refractive index of said predetermined regions and heating said layer in the presence of an applied electrical field, followed by cooling in the presence of the applied field, so as to orient the molecules of the compounds defined below, characterized in that said layer of organic material comprises a copolymer of a comonomer selected from the group consisting of alkyl acrylate wherein the alkyl moiety contains from about 1 to 5 carbons; alkyl methacrylate wherein the alkyl moiety contains from about 1 to 5 carbons, acrylamide, methacrylamide, and a styrene with a comonomer having the formula

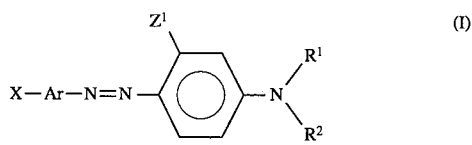

wherein (a) X is selected from the group consisting of —NO₂, —CN, —CH=C(CN)₂, —C(CN)=C(CN)₂, and —COOR³ wrehin R³ is alkyl, straight chain, cyclic, or branched having 1–20 carbon atoms, (b) Ar is selected from the group consisting of

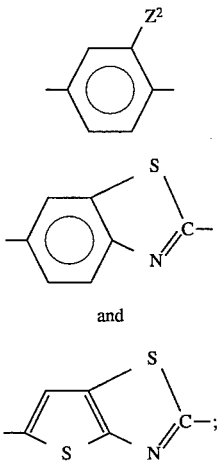

(c) $Z^1$ is selected from the group consisting of —H and —OH;

(d) $R^1$ is selected from the group consisting of (1) —$(CH_2)_m$—CH=$CH_2$, wherein m is an integer of from about 1–20

(2)

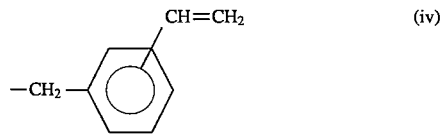

wherein m is an integer of from about 1–20 and the —CH=$CH_2$ substituent is in the m- or p- position, (3) —$(CH_2)_m$—O—M wherein m is an integer of from about 1–10, and wherein M is (i) —CH=$CH_2$
(ii) —C(O)—CH=$CH_2$,
(iii) —C(O)—C($CH_3$)=$CH_2$, or (iv)

—$CH_2$—⌬—CH=$CH_2$ wherein the —CH=$CH_2$ substituent is in the m- or p- position and (e) $R_2$ is selected from the group consisting of
(1) —H,
(2) alkyl, straight chain, branched or cyclic, having about 1–20 carbon atoms,
(3) —$C_nH_{2n}$ wherein n is an integer of from about 1–20, and
(4) an alkylene bridging group having 2 to 4 carbon atoms connecting the N atom to the o-position of the aromatic ring to which the N atom is attached;

with the proviso that $Z^1$ and $Z^2$ may not both be H if $R^2$ is not an alkylene bridging group having 2 to 4 atoms cnnecting the N atom to the o-position of the aromatic ring to which the N atom is attached.

2. The method of claim 1, wherein the comonomer is selected from the group consisting of a styrene.

3. The method of claim 1, wherein one of the comonomers is selected from the group consisting of methyl acrylate and methyl methacrylate.

4. The method of claim 1 wherein said first comonomer is methyl methacrylate.

5. The method of claim 1 wherein said second comonomer is

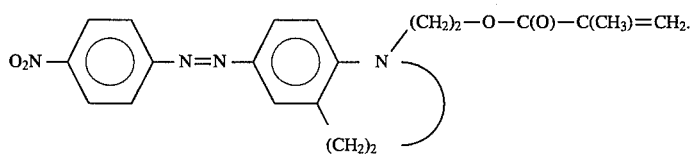

6. The method of claim 4 wherein said second comonomer is

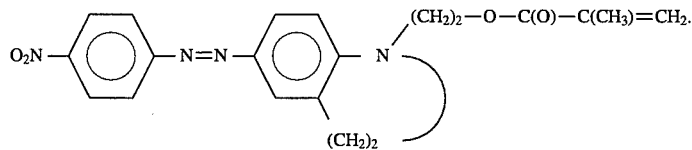

7. The method of claim 1 wherein said second comonomer is